United States Patent
Tharman

[11] 3,875,438
[45] Apr. 1, 1975

[54] SMALL ENGINE AUXILIARY ELECTRICAL SYSTEM

[75] Inventor: Paul A. Tharman, Milwaukee, Wis.
[73] Assignee: Briggs & Stratton Corporation, Wauwatosa, Wis.
[22] Filed: Nov. 8, 1973
[21] Appl. No.: 414,113

[52] U.S. Cl. ............... 310/68, 174/50.54, 339/258, 310/71, 357/79
[51] Int. Cl. ............................................. H01l 3/00
[58] Field of Search ........ 310/68, 71, 70 R; 357/74, 357/79, 80; 339/258 A; 322/90; 174/50.54; 320/25

[56] References Cited
UNITED STATES PATENTS
3,350,587 10/1967 Turk .................................. 310/71
3,671,851 6/1972 Harkness ............................. 322/90
3,723,836 3/1973 Shekerjian et al. ................. 357/79

Primary Examiner—J. D. Miller
Assistant Examiner—Robert J. Hickey

[57] ABSTRACT

An annular alternator stator core, mounted on the body of a small gasoline engine concentrically to a rotatable shaft that carries permanent magnet means, has two windings, each extending circumferentially about halfway around it. At one side of the core adjacent ends of the two windings are grounded to it. Leads extend from the other ends of the windings to nearby sockets fixed accessibly on the engine. One socket is an a.c. terminal; the other, comprising one terminal of a source of unidirectional battery charging current, can be a conventional fuseholder containing a novel readily replaceable diode unit.

8 Claims, 4 Drawing Figures

SMALL ENGINE AUXILIARY ELECTRICAL SYSTEM

This invention relates to electrical supply systems for machines powered by small internal combustion engines and is more particularly concerned with an electrical system that comprises a source of unidirectional current for charging a storage battery and a source of alternating current for energizing another load.

The electrical systems to which the present invention relates are used on machines such as riding tractors and riding mowers, wherein a small internal combustion engine that drives the machine also has a more or less integral alternator to provide current sources for battery charging and for energizing such accessories as headlights. The storage battery, which mainly serves as a power source for an engine self-starter, must be charged with unidirectional current, whereas headlights and other electrical accessories need to be energized only when the engine is running and can usually be powered by alternating current.

The engine driven alternator in such a system comprises one or more permanent magnets carried for orbital motion by a rotatably driven shaft of the engine, a magnetically permeable stator core mounted on the engine body adjacent to the magnet orbit, and one or more windings on the core in which alternating current is induced in consequence of magnet motion. The alternator is simple, inexpensive, compact and reliable, but when — as is usually the case — a storage battery is included in such an electrical system, the battery must be charged with unidirectional current, and therefore the system must also include a rectifier.

One commercially available prior electrical system comprising an integral engine driven alternator had two alternator windings. The a.c. output of one winding was used without rectification for energizing headlights and similar accessories that are normally operated only when the engine is running. The other winding was connected with a full-wave rectifier, and the unidirectional current output of the rectifier was in turn applied to battery charging. The battery charging winding had a higher resistance than the a.c. power winding, to limit the current through it to a value low enough to ensure that the battery would not be over-charged, thus avoiding the need for a voltage regulator.

That prior alternator had permanent magnet means carried in the cylindrical wall of a generally cup-shaped flywheel which also served as a blower for forcing cooling air across the engine body. The core of the stator was annular, and in the assembled engine the flywheel overlay the stator and surrounded it, so that the confined space available for the stator required it to be very compact.

A sheet metal blower shroud enclosed the flywheel and most of the engine body to direct the air draft from the blower across the hot parts of the engine. For compactness and protection, the full-wave rectifier comprised an encapsulated assembly that was mounted on a shelf-like baffle on the blower shroud, at its interior and adjacent to the flywheel, where the baffle could serve as a heat sink for the rectifier diodes.

The ungrounded output leads from the full-wave rectifier and from the a.c. power winding had to have terminals that were readily accessible outside the blower shroud, and these comprised socket terminals that were mounted on a bracket at the exterior of the blower shroud, in a protected bay defined by a wall of the blower shroud and a starter motor. The socket that comprised the rectifier output terminal was a tubular fuseholder that housed a fuse. In case the connections to the battery terminals were inadvertently reversed, the battery would be short-circuited through the full-wave rectifier, but the fuse would then blow to prevent the battery current from destroying the rectifier.

That prior electrical system was the product of the highest degree of skill and inventive ingenuity that could be applied to its conception and design. Indeed, there seems to be no obvious improvement that can be made in it, since it is compact, inexpensive and almost completely dependable, as evidenced by its striking commercial acceptance and its record of nearly trouble-free operation in widespread use.

But the small engine industry is a highly competitive one, constantly and vigorously striving to achieve any possible improvement in the cost, compactness and dependability of its products. The present invention has as its general object the further improvement of electrical systems of the type just described, so that both the manufacturer and the ultimate user will benefit from lower cost, greater convenience and further gain in an already high reliability.

In particular, the present invention is based upon a recognition that certain features of the above described electrical system which were previously accepted as unavoidable necessities, and which were not obviously undesirable, were in fact disadvantageous and could be eliminated. Thus, the present invention is based in part upon a recognition of the disadvantages of the full-wave rectifier assembly that was mounted on the blower shroud baffle. Such an assembly had to comprise four rectifier diodes, the connections between them, a mounting and heat sink for them, and means for making input and output connections to them. One object of the present invention is to effect a substantial improvement in the cost, simplicity and reliability of an electrical system of the character described by the provision of a rectifier assembly comprising a substantially lesser number of parts and mounted at a much more desirable location.

Of special importance to the user, each of the four diodes comprising the prior full-wave rectifier was potentially subject to failure; hence the reduction in the number of solid state rectifier components that is contemplated by the present invention improves reliability, as does the resulting reduction in the number of connections needed. Coupled with this reliability improvement is the important advantage that the rectifier means in the system of the present invention is readily accessible at the exterior of the engine, instead of being accessible only upon removal of the blower shroud, so that the user obtains the benefit of substantially lower repair costs and greatly reduced down time in the unlikely event of diode failure.

In achieving the objective of replacing the inaccessible full-wave rectifier assembly with a less costly and readily accessible rectifier, the present invention also achieves certain marked advantages in manufacturing convenience and reduction of costs. To facilitate both manufacture and repair, the full-wave rectifier assembly of the prior electrical system had to have readily disconnectable terminals for its two input connections and for its ungrounded output connection. Such terminals were relatively expensive, but a further objection arose from the inherent circuitry of the full-wave rectifier, which imposed a requirement for two long leads that are now recognized as undesirable. There had to be one conductor that extended a substantial distance circumferentially around the stator core, between the rectifier assembly and the end of the battery charging winding that was remote therefrom, and another conductor that extended about half-way around the stator core from the rectifier assembly which was at one side of the stator core, to the ungrounded battery charging terminal socket at the diametrically opposite side of the core. These conductors had to be carefully confined against the stator core to insure that they would not come into engagement with the nearby flywheel, and of course the presence of relatively bulky windings at intervals around the stator core did nothing to simplify or expedite installation of these leads.

Thus it is another object of the present invention to facilitate and reduce the cost of manufacturing an alternator stator for an electrical system of the character described, and to increase its reliability and sturdiness by making possible a shortening and improved routing of the conductors associated with it.

Another object of this invention is to provide a greatly improved rectifier assembly for an electrical system of the character described, affording a secure, well protected and readily accessible diode mounting and greatly facilitating diode replacement.

A further and more specific object of this invention is to provide a novel and easily mounted unit comprising a diode or similar solid state electrical component having a cylindrical body and terminal leads projecting from opposite ends of the body, in combination with cheap and easily installed contactor means by which the component is adapted for mounting in a tubular holder such as a conventional fuse holder and by which the component is reliably connected with terminals of the holder, said contactor means also providing an effective heat sink for the component.

Thus it is also a specific object of this invention to provide an assembly comprising a solid state diode or similar electronic component and mounting means for the same, which assembly enables the component to be very quickly and easily replaced.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of embodiments of the invention constructed according to the best modes so far devised for the practical application of the principles thereof, and in which.

Figure 1:
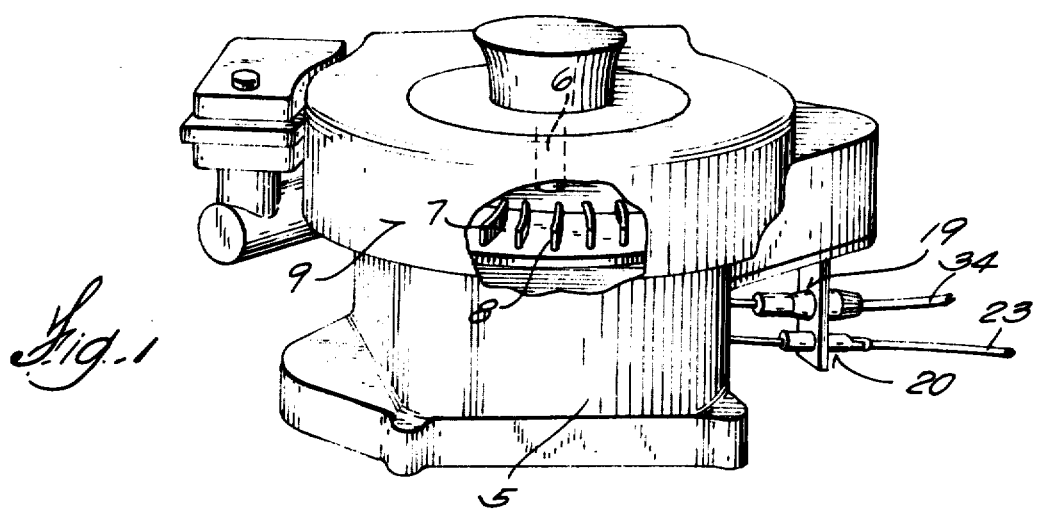
FIG. 1 is a perspective view of an engine with which there is associated an electrical system embodying the principles of this invention.

Referring now more particularly to the accompanying drawings, the numeral 5 designates generally the body of a small internal combustion engine such as is used for powering small tractors, riding mowers and similar machines. The crankshaft 6 of the engine projects out of the body and carries a substantially cup-shaped flywheel 7 that has blower vanes 8 on its periphery. The stream of cooling air generated by the flywheel blower is guided across the hot parts of the engine by a sheet metal blower shroud 9 that surrounds the flywheel and a substantial portion of the engine body but has a rather large air inlet hole concentric with the flywheel.

Secured to the engine body, concentrically with the crankshaft 6 and within the rim of the cup-shaped flywheel, is an annular stator core 10 having radially outwardly projecting pole portions 11. Around certain of the pole portions of the stator there are coils that comprise a battery charging winding 12 and an a.c. power winding 13. Alternating currents are induced in these windings by one or more permanent magnets 14 mounted in the cylindrical side wall of the flywheel to be carried in orbital motion past the pole portions 11 as the flywheel rotates.

Each of the windings 12, 13 is preferably confined to pole portions at its own side of a diametral line through the stator core, and as illustrated each winding comprises coils embracing four pole portions of the core. The battery charging winding 12 is of lighter gage wire than the a.c. power winding 13, so as to have a higher resistance that limits the current through it to a value low enough to prevent battery overcharging.

Because each winding extends circumferentially about half-way around the core, the two windings have adjacent end portions at diametrically opposite sides of the core. At one side of the core these adjacent end portions of the two windings are crimp connected to an eyelet grounding terminal 15. One of the screws 16 that secures the core to the engine body also passes through the eyelet terminal to secure it to the stator core and electrically ground it to the engine body.

The ungrounded end portions of the two windings are respectively spliced to a pair of leads 17, 18, each comprising an insulated conductor. Each lead 17, 18 has its end remote from the splice connected to a socket 19, 20, respectively. Each socket provides a power source terminal, the socket 20 being one of the terminals of an a.c. power source while the socket 19 comprises a terminal of a source of unidirectional current. In each case the other terminal of the power source is provided by the grounded engine body and metal parts connected with it.

The two sockets are rigidly mounted side-by-side on a suitable bracket 21 on the engine body, preferably in a bay or inside corner on the exterior of the engine body where they will be protected but readily accessible.

At this point it should be noted that the stator can easily be so oriented that the ungrounded ends of the two windings are as close as possible to the socket mounting bracket 21, to allow the leads 17 and 18 to be very short. This follows from the fact that the grounded ends of the two windings can be located anywhere around the stator circumference inasmuch as they need have only a grounding connection to the stator core itself.

The a.c. outlet socket 20 can be a generally conventional female terminal plug, adapted to receive a male plug-in connector 22 on a lead 23 that comprises the ungrounded input terminal of an a.c. load circuit.

The other socket 19 is of substantially different form than the socket 20, not only to prevent possible misconnection of the two load circuits but also to enable the socket 19 to accommodate a single solid-state rectifier diode 24 that converts the a.c. output of the winding 12 into unidirectional current suitable for battery charging. By reason of the novel diode rectifier unit described hereinafter, the socket 19 can take the form of a substantially conventional fuse holder, and can thus be a standard and readily available part.

Before going on to other structural details of the apparatus, attention should be given to the fact that with the electrical system of the present invention half-wave rectified a.c. is supplied for battery charging. As compared to apparatus incorporating a full wave rectifier, a slightly heavier wire is needed for the winding 12 to assure that there will be sufficient current flow to the battery when its charge is low. However, if the resistance of the winding 12 is not made too low, there will be no danger of overcharging the battery, even though the apparatus includes no regulator, because charging current is applied to the battery in intermittent pulses (i.e., during only one phase of the alternating voltage across the winding 12), and the total current applied to the battery over a given time is thus kept low enough to prevent overcharging.

The single rectifier diode 24 preferably has a higher current rating than that of an equivalent full-wave rectifier; hence the diode itself may cost about the same as the four diodes required in a full-wave rectifier but the apparatus as a whole will be more rugged and reliable. Furthermore, there is an overall cost saving that results from eliminating the connections between the several diodes, together with the mounting and encapsulation for them. That cost saving is enhanced by the convenience of the novel mounting means that the present invention makes available for the single diode, in taking advantage of the fact that its size enables it to fit nicely inside a conventional fuse-holder socket that can be mounted outside the blower shroud.

Comment should also be made about the absence of a fuse from the apparatus of this invention. The low power of the system (12–14 volts and 3–5 amps. per winding) makes it unnecessary to protect the wiring and load components with fuses. In the event the battery is misconnected, it would of course discharge itself through the diode 24 and the winding 12; but owing to the winding resistance in series with the battery, the current through the diode and the winding will not be high enough to harm either of them, and the battery will discharge slowly enough not to be permanently harmed either.

Turning now to the assembly comprising the diode rectifier 24 and its holder 19, the holder comprises a substantially tubular body 25 of insulation material having a uniform diameter bore with an end wall 26 at one end thereof and a mouth 27 at its other end. A hole through the end wall 26 receives the lead 17 which extends into the bore of the tubular body towards its mouth 27.

Figure 3:
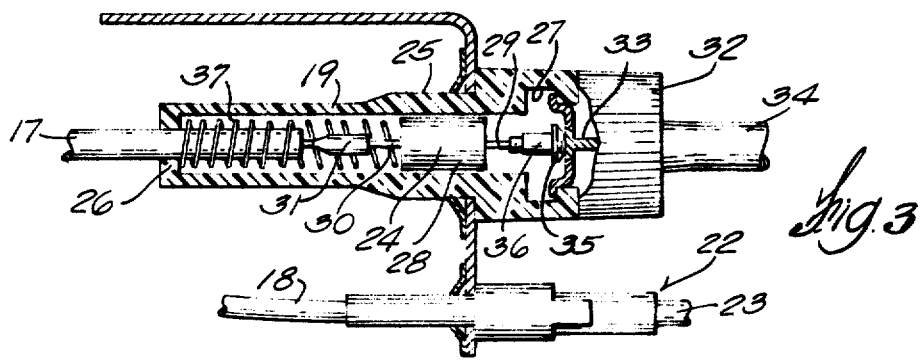
FIG. 3 is a longitudinal sectional view of a combined diode mounting and outlet terminal socket embodying principles of this invention, illustrated in assembled relation to an a.c. terminal socket, shown in side elevation.

As is conventional, the diode 24 has a cylindrical body 28 and a pair of terminal leads 29 and 30 that project outwardly from the ends of its body. The diode is received in the bore in the holder body, forwardly of the lead 17. As shown in FIG. 3, the terminal lead 30 of the diode is more or less permanently connected with the front end of the lead 17, as by means of a crimp connector 31. Accordingly, the diode can be replaced fairly easily by pulling it and its connected lead 17 forwardly out of the mouth of the holder (the lead will have enough slack for this), cutting the connection, and making a new connection between the lead and a replacement diode.

When the system is operative, the mouth of the tubular holder 19 is closed by a cap-like closure 32 of insulating material which is fastened to the holder by a conventional bayonet type connection. Inside this closure there is secured a metal contactor terminal 33 that faces rearwardly into the holder body when the closure member is installed thereon. The contactor terminal 33 has a good electrical and mechanical connection with a lead 34 which provides for connection with the ungrounded terminal of a storage battery (not shown).

On the front terminal lead 28 of the diode there is a substantially mushroom-shaped contactor 35 that has its head portion in contacting engagement with the contactor terminal 33 on the closure. The stem portion 36 of the contactor 35 comprises a crimp connector that is secured to the diode terminal lead 29. The front or outer surface of the head portion of the mushroom-shaped contactor is somewhat rounded or dome-like, to insure good electrically connecting contact with the contactor terminal 33; and, to that same end, rigidity of that head portion relative to the diode body 28 is assured by connecting the stem portion 36 to the diode terminal lead 29 at a location close to the diode body.

Firm engagement between the contactor 35 on the diode and the contactor terminal 33 on the closure member is maintained by a coiled expansion spring 37 that surrounds the rear diode lead 30 and its connected portion of the lead 17 and reacts between the diode body 28 and the end wall 26 to bias the diode forwardly.

Heat from the diode is dissipated into the leads 17 and 34 through its connections to them, as well as being radiated from the connections themselves.

Figure 4:
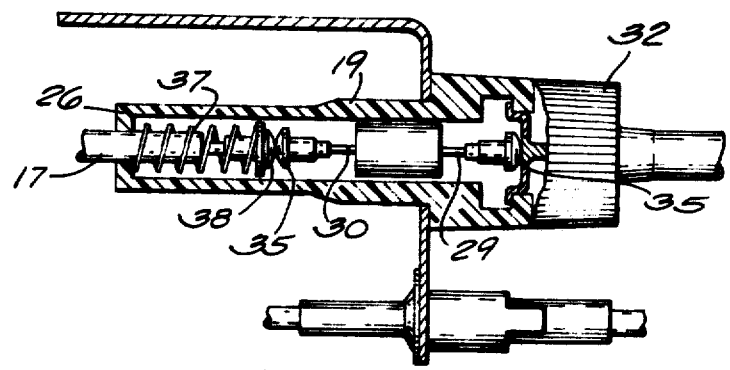
FIG. 4 is a view similar to FIG. 3 but showing only the diode mounting and outlet terminal socket in a modified embodiment thereof.
Figure 2:
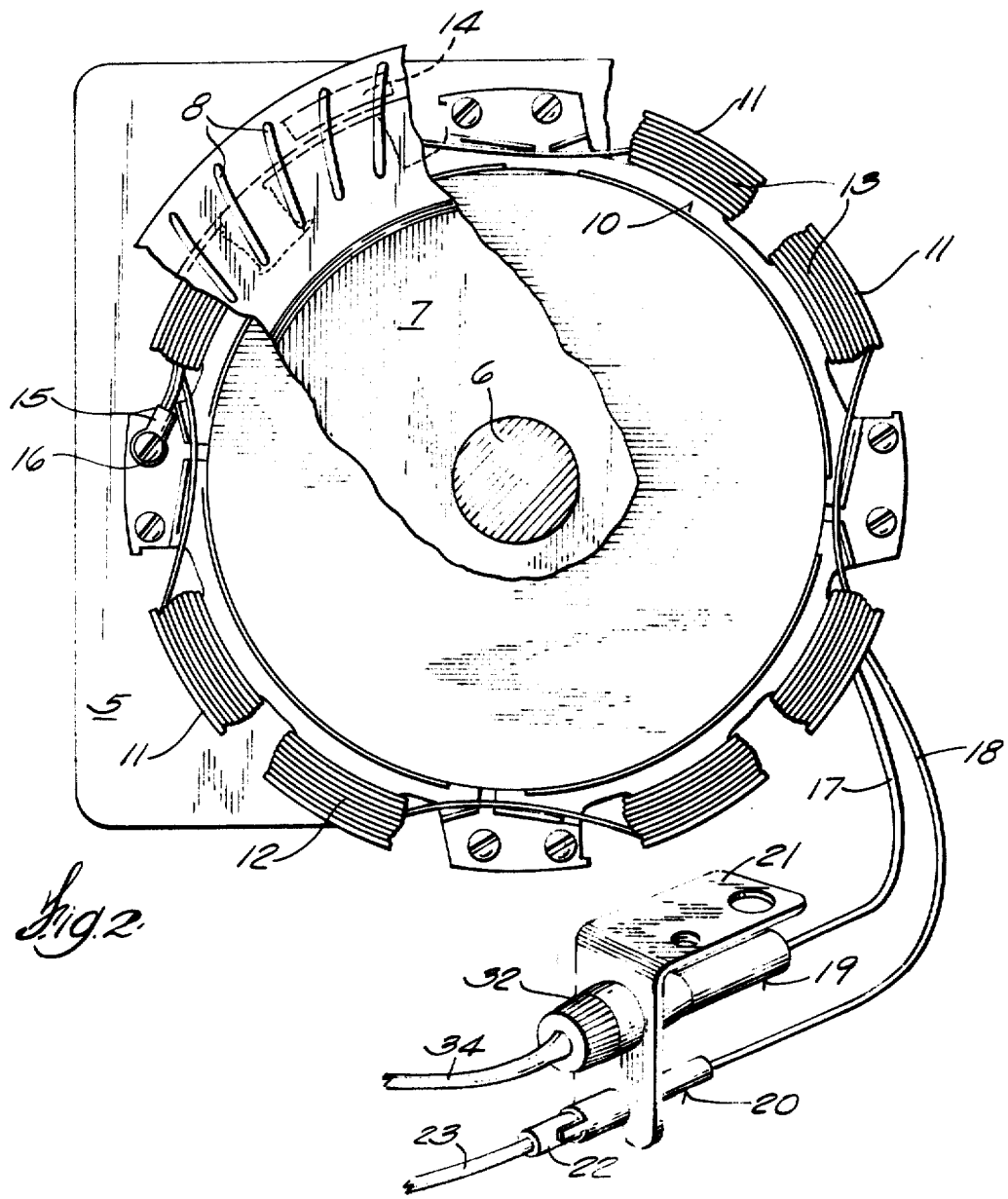
FIG. 2 is a fragmentary plan view, with portions shown broken away, of the alternator of an electrical system of this invention, shown in its assembled relation to the body, flywheel and blower shroud of an engine on which it is installed and in its connections to a pair of outlet terminal sockets, the latter being shown in perspective and in disassembled relation to the engine.

In the embodiment of the invention illustrated in FIG. 4, the holder 19 and its closure member 32 are as described above, but the diode is almost instantly replaceable without the need for any tool. In this case both terminal leads 29 and 30 of the diode have mushroom-shaped contactors 35 connected to them, and another such mushroom-shaped contactor 38 is secured to the adjacent end of the lead 17. To insure good electrical connections with both of the diode terminal leads, the expansion spring 37 reacts between the end wall 26 and the mushroom-shaped contactor 38 on the lead 17, thus urging that contactor toward the contactor terminal 33 on the closure 32 for clamping cooperation with the mushroom-shaped contactors on the diode.

The enlarged heads of the mushroom-shaped contactors secured to the terminal leads on the diode provide fairly good heat radiating surfaces, to serve as heat sinks for the diode; and, in addition, they serve to transmit heat into their connected leads 17 and 34 so that the latter can thus serve as supplemental heat sinks.

From the foregoing description taken with the accompanying drawings it will be apparent that this invention provides an extremely simple, reliable and inexpensive electrical system of the type comprising an alternator integral with a small engine and having two windings, one of which provides an a.c. power source for electrical accessories on a machine powered by the engine and the other of which is connected with a very simple rectifier to provide a source of unidirectional current for battery charging. It will also be evident that the electrical system of this invention overcomes certain disadvantages which were inherent in prior comparable electrical systems and which had not been recognized as disadvantages.

Those skilled in the art will appreciate that the invention can be embodied in forms other than as herein disclosed for purposes of illustration.

The invention is defined by the following claims.

I claim:

1. An electric power source for a machine driven by an engine having a body, a power output shaft journaled in the engine body, and an alternator rotor having permanent magnet means thereon rotatable with said shaft, said power source comprising:
   A. an alternator stator having a core with two windings thereon;
   B. means for securing said stator to the engine body in cooperative relation to the rotor of the alternator;
   C. a grounding terminal connected to one end of each of said stator windings, said grounding terminal being physically and electrically connectable to said core of the stator by the same means which secures the stator to the engine body;
   D. a lead extending from the opposite end of each of said two windings; said two leads being the only wires coming from the stator;
   E. a socket of insulating material on the end of one of said leads with a terminal therein that is connected to the end of said lead;
   F. a second socket of insulating material on the end of the other of said leads;
   G. a solid state rectifier in said second socket having one of its terminals connected with the end of said other lead and its other terminal having a contactor thereon; and
   H. means for mounting said two sockets on a part rigid with the engine body with the mouths of said sockets at readily accessible locations,
      so that a direct current circuit for charging a battery with which the machine is equipped and an alternating current circuit with which the machine is equipped are each readily connectable with one of the stator windings by the insertion of terminals of said circuits into the mouths of said sockets.

2. The invention defined by claim 1, wherein said sockets have differently shaped mouths, so that the provision of correspondingly different shaped terminals for said circuits precludes error in the connection thereof with the stator windings.

3. The invention defined by claim 1, wherein said solid state rectifier is removable from the socket in which it is located, to permit replacement thereof without disturbing any part of the alternator or the engine.

4. The invention defined by claim 1 wherein said solid state rectifier has a substantially cylindrical body and has terminals that comprise a lead extending from each end of its body, further characterized by the contactor on said other terminal comprising a substantially mushroom-shaped member that has its stem portion secured to the lead that comprises said other terminal and having its head portion extending transversely and substantially concentrically to said lead to provide a contact surface engageable with an opposing contact surface in said second socket.

5. An electrical power supply for a machine powered by an internal combustion engine that has a body and a rotatably driven shaft that projects outwardly from the body, said power supply being of the type comprising a pair of alternator windings mounted on said body, each extending circumferentially partway around a circle concentric to said shaft and being cooperable with permanent magnet means carried by said shaft for orbital motion, one of said windings being adapted for connection with a load that can be energized with alternating current and the other being connectable with a load such as a storage battery that must be energized with unidirectional current, said power supply being characterized by:
   A. each of said windings having one of its ends grounded, and the grounded ends of the windings being adjacent to one another;
   B. two leads, one for each winding, each of said leads being connected at one of its ends with the other end of its winding;
   C. a pair of sockets, one for each of said leads, each comprising a terminal member connected with the other end of its lead, and both mounted on the engine body with their mouths at accessible locations,
      1. the socket for the lead connected with said one winding being cooperable with a first terminal connector to provide a connection between said one winding and a load to be energized with alternating current,
      2. the other socket being formed to cooperate with a second cooperating terminal connector that is connected with a load to be energized with unidirectional current, and being also formed to receive a substantially cylindrical diode that has terminals at its ends which are respectively connectable with the terminal member of said other socket and with the second cooperating terminal connector,
      3. said sockets being formed to cooperate with terminal connectors that are substantially different from one another, so that the sockets are self-identifying to preclude misconnection of loads; and
   D. a substantially cylindrical solid state rectifier diode in said other socket.

6. The power supply of claim 5 wherein said diode has terminal leads that project outwardly from its opposite ends, further characterized by:
   E. the second terminal connector having a releasable mechanical connection to said other socket and having a contact surface which faces into said other socket, said contact surface being electrically connectable with a load to be energized with unidirectional current;

F. a substantially mushroom-shaped contactor on one of said terminal leads of said diode, the stem portion of said contactor being secured to said one terminal lead and the head portion of said contactor extending transversely across the outer end of said terminal lead to oppose and make contacting engagement with said contact surface of the second terminal connector; and G. means connecting the other terminal lead of the diode with the lead for said other socket.

7. The power supply of claim 6, wherein said other socket is substantially tubular with an apertured end wall at one end and an open mouth at its other end, and wherein its lead enters the socket through the aperture in said end wall, and further characterized by:

H. the terminal member for said other socket comprising a second mushroom-shaped contactor having its stem portion connected with the lead for said other socket, and being confined against motion out of said other socket in one direction by said apertured end wall; and I. a third mushroom-shaped contactor secured to the other terminal lead of said diode and having its head portion opposingly engaging the head portion of said second mushroom-shaped contactor.

8. The power supply of claim 7, further characterized by:

J. a coiled expansion spring in said other socket, surrounding an end portion of its lead and axially confined between said apertured end wall and the head of the second mushroom-shaped contactor to bias the latter towards said contact surface and thus maintain good contacts with the mushroom-shaped contactors on the diode.

* * * * *